US010283115B2

(12) United States Patent
Gomez et al.

(10) Patent No.: US 10,283,115 B2
(45) Date of Patent: May 7, 2019

(54) VOICE PROCESSING DEVICE, VOICE PROCESSING METHOD, AND VOICE PROCESSING PROGRAM

(71) Applicant: HONDA MOTOR CO., LTD., Tokyo (JP)

(72) Inventors: Randy Gomez, Wako (JP); Kazuhiro Nakadai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/623,807

(22) Filed: Jun. 15, 2017

(65) Prior Publication Data

US 2018/0061398 A1    Mar. 1, 2018

(30) Foreign Application Priority Data

Aug. 25, 2016    (JP) .................................. 2016-164608

(51) Int. Cl.
| | |
|---|---|
| *G10L 15/06* | (2013.01) |
| *G10L 15/20* | (2006.01) |
| *G10L 15/22* | (2006.01) |
| *G10L 21/028* | (2013.01) |
| *G10L 21/0208* | (2013.01) |
| *G10L 21/0232* | (2013.01) |

(52) U.S. Cl.
CPC ............ *G10L 15/20* (2013.01); *G10L 15/063* (2013.01); *G10L 15/22* (2013.01); *G10L 21/028* (2013.01); *G10L 21/0232* (2013.01); *G10L 2015/0635* (2013.01); *G10L 2021/02082* (2013.01)

(58) Field of Classification Search
None
See application file for complete search history.

(56) References Cited

U.S. PATENT DOCUMENTS

| | | | | |
|---|---|---|---|---|
| 8,738,376 | B1* | 5/2014 | Goel | G10L 15/14 704/205 |
| 9,820,036 | B1* | 11/2017 | Tritschler | H04R 1/326 |
| 9,858,949 | B2* | 1/2018 | Nakadai | G10L 25/78 |

(Continued)

FOREIGN PATENT DOCUMENTS

JP    5530741    4/2014

OTHER PUBLICATIONS

Gomez (Gomez, Randy, et al. "Hands-free human-robot communication robust to speaker's radial position." Robotics and Automation (ICRA), 2013 IEEE International Conference on. IEEE, 2013.).*

(Continued)

*Primary Examiner* — Pierre Louis Desir
*Assistant Examiner* — Jonathan C Kim
(74) *Attorney, Agent, or Firm* — Rankin, Hill & Clark LLP

(57) ABSTRACT

A separation unit separates voice signals of a plurality of channels into an incoming component in each incoming direction, a selection unit selects a statistic corresponding to an incoming direction of the incoming component separated by the separation unit from a storage unit which stores a predetermined statistic and a voice recognition model for each incoming direction, an updating unit updates the voice recognition model on the basis of the statistic selected by the selection unit, and a voice recognition unit recognizes a voice of the incoming component separated using the voice recognition model.

6 Claims, 5 Drawing Sheets

(56) References Cited

U.S. PATENT DOCUMENTS

| | | | |
|---|---|---|---|
| 2002/0120444 A1* | 8/2002 | Botterweck | G06K 9/6247 704/236 |
| 2003/0177006 A1* | 9/2003 | Ichikawa | G10L 21/0216 704/231 |
| 2003/0191636 A1* | 10/2003 | Zhou | G10L 15/065 704/226 |
| 2004/0054531 A1* | 3/2004 | Asano | G10L 15/20 704/231 |
| 2004/0093210 A1* | 5/2004 | Toyama | G10L 15/07 704/233 |
| 2007/0005350 A1* | 1/2007 | Amada | 704/211 |
| 2008/0167869 A1* | 7/2008 | Nakadai | G10L 15/20 704/233 |
| 2008/0300875 A1* | 12/2008 | Yao | G10L 15/065 704/236 |
| 2009/0018828 A1* | 1/2009 | Nakadai | G10L 15/20 704/234 |
| 2009/0030552 A1* | 1/2009 | Nakadai | G06N 3/008 700/258 |
| 2010/0082340 A1* | 4/2010 | Nakadai | G10L 15/20 704/233 |
| 2010/0208904 A1* | 8/2010 | Nakajima | H04R 1/406 381/58 |
| 2011/0224980 A1* | 9/2011 | Nakadai | G10L 15/20 704/233 |
| 2011/0301953 A1* | 12/2011 | Lee | G10L 15/07 704/243 |
| 2012/0173234 A1* | 7/2012 | Fujimoto | G10L 15/20 704/233 |
| 2013/0311182 A1* | 11/2013 | Kim | G10L 15/04 704/240 |
| 2014/0286497 A1* | 9/2014 | Thyssen | H04R 3/005 381/66 |
| 2015/0012268 A1* | 1/2015 | Nakadai | G10L 15/20 704/233 |
| 2015/0058003 A1* | 2/2015 | Mohideen | G10L 15/20 704/233 |
| 2015/0066500 A1* | 3/2015 | Gomez | G10L 15/20 704/233 |
| 2015/0088497 A1* | 3/2015 | Gomez | G10L 21/0208 704/226 |
| 2016/0180852 A1* | 6/2016 | Huang | G10L 17/005 704/246 |
| 2016/0203828 A1* | 7/2016 | Gomez | G10L 15/20 704/226 |
| 2016/0372129 A1* | 12/2016 | Nakadai | G10L 21/028 |

OTHER PUBLICATIONS

Gomez, Randy, and Tatsuya Kawahara. "Optimizing spectral subtraction and wiener filtering for robust speech recognition in reverberant and noisy conditions." Acoustics Speech and Signal Processing (ICASSP), 2010 IEEE International Conference on. IEEE, 2010. (Year: 2010).*

Gomez (Gomez, Randy, et al. "Hands-free human-robot communication robust to speaker's radial position." Robotics and Automation (ICRA), 2013 IEEE International Conference on. IEEE, 2013.) (Year: 2013).*

* cited by examiner

FIG. 5
```
Sp1: Hello, I visited a restaurant in Tokyo and they served me sake.
Do you know what is it in English ?
Rb1: They call it rice wine.
Sp2: Then, what is sweetfish in Japanese ?
Rb2: They say Ayu .
```
FIG. 6
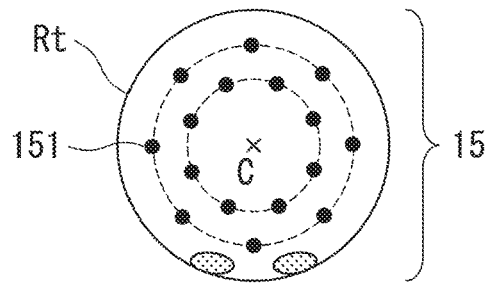
FIG. 7
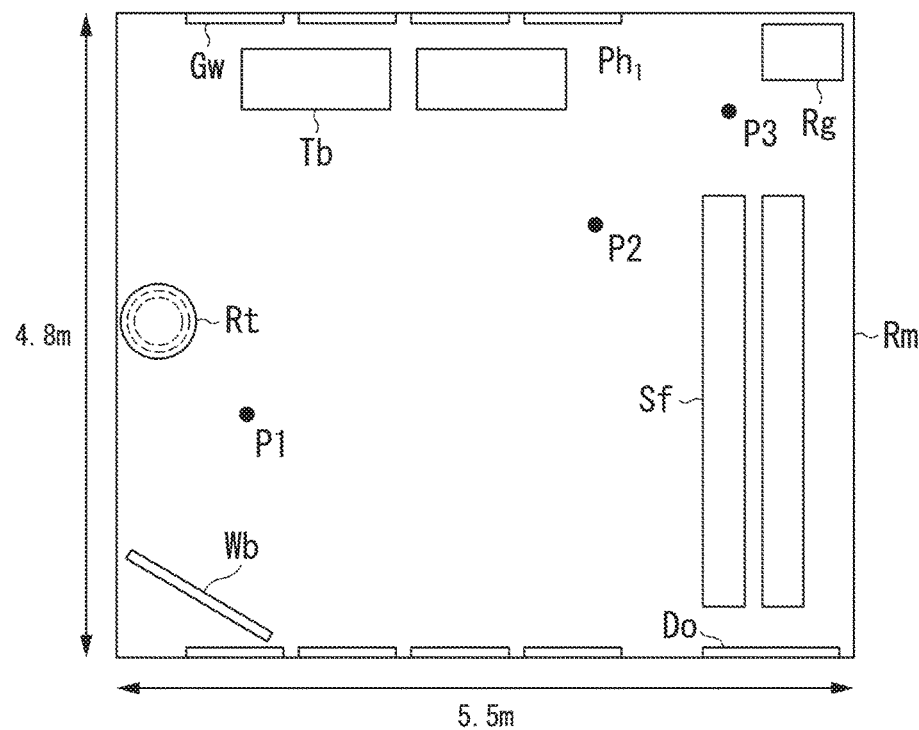

VOICE PROCESSING DEVICE, VOICE PROCESSING METHOD, AND VOICE PROCESSING PROGRAM

CROSS-REFERENCE TO RELATED APPLICATION

Priority is claimed on Japanese Patent Application No. 2016-164608 filed in Japan on Aug. 25, 2016, the content of which is incorporated herein by reference.

BACKGROUND OF THE INVENTION

Field of the Invention

The present invention relates to a voice processing device, a voice processing method, and a voice processing program.

Description of Related Art

A voice uttered by a speaker in a room is reflected by wall surfaces and installation objects to generate a reflected sound. A voice recognition device installed in the room receives a voice obtained by adding the reflected sound to a direct sound directly arriving from a speaker. Such a reflected sound causes a decline of a voice recognition rate. For voice recognition, it has been proposed to use an acoustic model generated in consideration of a room environment in advance. However, to create an acoustic model in accordance with a room environment, it is necessary to collect a large amount of voice data in a room in advance, and thus a large amount of time and work are spent.

To improve a recognition rate in voice recognition, reverberation suppression processing has been proposed as pre-processing. For example, Japanese Patent No. 5530741 discloses a reverberation suppression device which includes a delay addition unit configured to generate a delay added signal for delaying at least one of a plurality of sound signals by a predetermined delay time, a reverberation suppression processing unit configured to perform reverberation suppression processing using the delay added signal, and a sound source direction estimation unit configured to estimate a sound source direction on the basis of a sound signal. The delay addition unit calculates a delay time on the basis of a distance among a plurality of sound receiving devices for collecting sound signals and the estimated sound source direction.

SUMMARY OF THE INVENTION

A reflected sound component suppressed by reverberation suppression processing is information which represents an acoustic environment in a room, but has been ignored as an unnecessary component in voice recognition processing in some cases. On the other hand, a voice recognition device is sometimes mounted on a robot and the like, and an incoming direction of a main reflected sound, which is observed, changes due to movement. Such a change in the acoustic environment has caused a decline of voice recognition accuracy.

Embodiments of the present invention have been made in view of the above points, and an object thereof is to provide a voice processing device, a voice processing method, and a voice processing program capable of ensuring voice recognition accuracy regardless of changes in a sound environment.

In order to achieve the above objects, the present invention has adopted following embodiments.

(1) A voice processing device according to an aspect of the present invention includes a separation unit configured to separate voice signals of a plurality of channels into an incoming component in each incoming direction, a storage unit configured to store a predetermined statistic and a voice recognition model for each incoming direction, a selection unit configured to select a statistic corresponding to an incoming direction of the incoming component separated by the separation unit from the storage unit, an updating unit configured to update the voice recognition model on the basis of the statistic selected by the selection unit, and a voice recognition unit configured to recognize a voice of the incoming component using the voice recognition model.

(2) In the aspect (1) described above, the statistic may be the same type of parameter as at least some parameters of the voice recognition model, and the voice processing device may also include a generation unit configured to store in the storage unit a statistic calculated so that likelihood for the incoming components increases.

(3) In the aspect (2) described above, the voice recognition model may be a model which represents an output probability of an acoustic feature amount as a linear combination of a plurality of Gaussian functions, the statistic may be a mixture weight, a mean, and variance of the Gaussian functions, and the updating unit may update a mean and variance of a Gaussian function of the voice recognition model to increase likelihood for the incoming component.

(4) In any one of the aspects (1) to (3) described above, the separation unit may separate a direct sound component from a sound source from a reflected sound component as the incoming component, and the voice recognition unit may recognize a voice of the direct sound component.

(5) In any one of the aspects (1) to (4) described above, a dereverberation unit configured to generate a dereverberation component using a predetermined filter coefficient from the incoming component separated by the separation unit, and to calculate the filter coefficient to reduce a difference between power of the dereverberation component and power of a dereverberation component estimated on the basis of the incoming component in a voiced section and the incoming component in a voiceless section may be further included.

(6) A voice processing method according to another aspect of the present invention is a voice processing method in a voice processing device, and includes a separation process of separating voice signals of a plurality of channels into an incoming component in each incoming direction, a selection process of selecting a statistic corresponding to an incoming direction of the incoming component separated in the separation process from a storage unit which stores a predetermined statistic and a voice recognition model for each incoming direction, an updating process of updating the voice recognition model on the basis of the statistic selected in the selection process, and a voice recognition process of recognizing a voice of the incoming component using the voice recognition model.

(7) A voice processing program according to still another aspect of the present invention includes a separation process of separating voice signals of a plurality of channels into an incoming component in each incoming direction, a selection process of selecting a statistic corresponding to an incoming direction of the incoming component separated in the separation process from a storage unit which stores a predetermined statistic and a voice recognition model for each incoming direction, an updating process of updating the voice recognition model on the basis of the statistic selected in the selection process, and a voice recognition process of recognizing a voice of the incoming component using the voice recognition model.

According to the aspects (1), (6), or (7), utterance content of a voice of an incoming component is recognized using a voice recognition model updated on the basis of a statistic corresponding to an incoming direction of the incoming component. For this reason, decline of voice recognition accuracy due to a change in the acoustic environment according to a positional relationship between a sound source and a sound receiving unit 15 can be suppressed.

In the case of the aspect (2) described above, a parameter which increases the likelihood of an incoming component varying according to the acoustic environment in which a sound source and a sound receiving unit for acquiring voice signals of a plurality of channels are installed is acquired as a statistic, and can be stored in a model storage unit 122 in correlation with an incoming direction of the incoming component. For this reason, the decline of voice recognition accuracy can be suppressed, and at the same time, an operation amount or a processing time can be reduced as compared to updating all parameters of a voice recognition model in parallel with voice recognition.

In the case of the aspect (3) described above, a mean and variance of a Gaussian function are updated as parameters which can effectively describe a variation in an output probability in accordance with an acoustic feature amount by an incoming component. For this reason, the decline of voice recognition accuracy can be suppressed, and at the same time, the operation amount or the processing time in updating of a voice recognition model can be reduced.

In the case of the aspect (4) described above, a voice of a direct sound component directly arriving from a sound source among various incoming components is recognized. Since a reflected sound component which causes a decline of voice recognition accuracy is excluded from a recognition target, the decline of voice recognition accuracy can be further suppressed.

In the case of the aspect (5) described above, an incoming component in a voiceless section is regarded as a reverberation component, and a filter coefficient is calculated so that a dereverberation component generated using a filter coefficient from an incoming component approximates a dereverberation component obtained by removing the reverberation component from an incoming component in a voiced section. For this reason, a voice component can be obtained as a reverberation component generated using a filter coefficient calculated for an incoming component, and a voice of the obtained voice component can be recognized. Since a voice from which a reverberation component causing decline of voice recognition accuracy is removed is gradually obtained as a recognition target, the decline of voice recognition accuracy can be further suppressed.

BRIEF DESCRIPTION OF THE DRAWINGS

FIG. 5 is a diagram which shows an example of conversation data according to the second embodiment.

FIG. 6 is a plan view which shows a configuration example of a sound receiving unit according to the second embodiment.

FIG. 7 is a plan view which shows an example of a laboratory used for an experiment.

DETAILED DESCRIPTION OF THE INVENTION

First Embodiment

Hereinafter, a first embodiment of the present invention will be described with reference to drawings.

Figure 1:
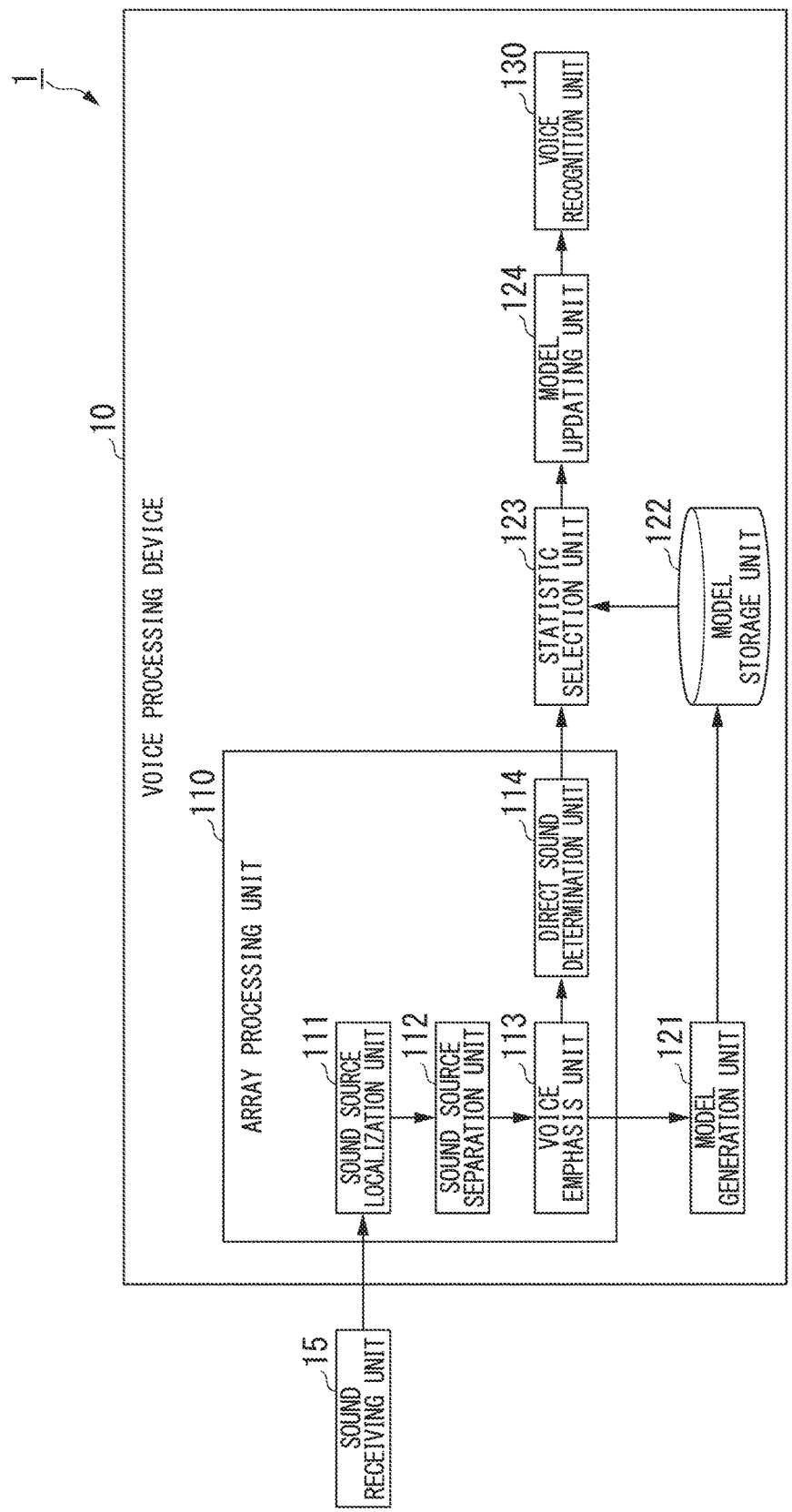
FIG. 1 is a block diagram which shows a configuration example of a voice processing system according to a first embodiment.

FIG. 1 is a block diagram which shows a configuration example of a voice processing system 1 according to the present embodiment.

The voice processing system 1 is configured to include a voice processing device 10 and a sound receiving unit 15.

The voice processing device 10 separates voice signals input from the sound receiving unit 15 into incoming component signals which indicate an incoming component in each incoming direction to the sound receiving unit 15, and selects a statistic corresponding to a separated incoming component signal from a storage unit which has stored a voice recognition model having a statistic in each incoming direction. Then, the voice processing device 10 updates the voice recognition model using the selected statistic and performs voice recognition processing on a direct sound component of the incoming component using the updated voice recognition model.

The incoming component whose incoming direction is identified includes a direct sound and reflected sounds. The direct sound is a component of a sound arriving directly from a sound source. The reflected sound is a component of a sound which is reflected by a surface of a reflection object such as a wall surface and arrives among sounds emitted from the sound source. In an example shown in FIG. 2, an incoming direction of a direct sound Dt arriving at the sound receiving unit 15 is a direction of a speaker Hs which targets the sound receiving unit 15. Incoming directions of reflected sounds $Ph_1, \ldots, Ph_m, \ldots, Ph_M$ mainly arriving at the sound receiving unit 15 are directions of reflective surfaces that generate these reflected sounds. Accordingly, the incoming directions of reflected sounds are generally different from an incoming direction of a direct sound Dt. In an example to be described below, a difference in incoming direction due to a reflected component is used. A component in which a plurality of reflected components overlap each other over an elapse of time and respective reflected components and incoming directions of the respective reflected components cannot be distinguished from each other corresponds to reverberation.

Returning to FIG. 1, the sound receiving unit 15 receives voice signals of N (N is an integer of two or more) channels and transmits the received voice signals to the voice processing device 10. The sound receiving unit 15 is a microphone array in which, for example, N electro-acoustic transform elements are included and disposed as a sound receiving element. Each of the electro-acoustic transform elements records a voice signal of one channel. The sound receiving unit 15 may transmit the recorded voice signal by radio or by wire. A position of the sound receiving unit 15 may be fixed or it may be installed in a moving body such as a vehicle, an aircraft, or a robot to be movable. The sound receiving unit 15 may be integrated with the voice processing device 10 or may be separated therefrom.

Next, a configuration of the voice processing device 10 will be described.

The voice processing device 10 is configured to include an array processing unit 110, a model generation unit 121, a model storage unit 122, a statistic selection unit 123, a model updating unit 124, and a voice recognition unit 130.

The array processing unit 110 acquires incoming component signals used in voice recognition processing, or generation and training of a voice recognition model from voice signals of $\Phi$ ($\Phi$ is an integer of two or greater) channels input from the sound receiving unit 15. The array processing unit 110 is configured to include a sound source localization unit 111, a sound source separation unit 112, a voice emphasis unit 113, and a direct sound determination unit 114.

The sound source localization unit 111 performs predetermined sound source localization processing on the voice signals of $\Phi$ channels input from the sound receiving unit 15 for each period set in advance (for example, 50 ms), and estimates K (K is an integer of two or greater and less than $\Phi$) incoming directions. The incoming direction is a direction in which an incoming component arrives. The predetermined sound source localization processing is, for example, a multiple signal classification (MUSIC) method. The sound source localization unit 111 correlates the voice signals of $\Phi$ channels with incoming direction signals which indicate the estimated incoming directions and outputs a result to the sound source separation unit 112. A specific example for estimation of incoming directions by the MUSIC method will be described below.

The sound source separation unit 112 performs predetermined blind source separation processing (BSS) on the voice signals of $\Phi$ channels input from the sound source localization unit 111 and separates the voice signals into incoming component signals which indicate an incoming component in each of the K incoming directions indicated by incoming direction signals. The incoming component signal is a voice signal which indicates an incoming component in each corresponding incoming direction. The predetermined blind source separation processing is, for example, a geometric-constrained high-order correlation-based source separation (GHDSS) method. The sound source separation unit 112 outputs the separated incoming component signals in each incoming direction to the voice emphasis unit 113. The sound source separation unit 112 may also output the input incoming direction signal to the voice emphasis unit 113. A specific example of sound source separation by the GHDSS method will be described below.

The voice emphasis unit 113 suppresses a reverberation component included in an incoming component in each incoming direction indicated by the incoming component signal input from the sound source separation unit 112 using a predetermined reverberation suppression method. By suppressing the reverberation component, a voice component included in the incoming component is emphasized. The predetermined reverberation suppression method is, for example, a Wiener Filtering method. The voice emphasis unit 113 outputs the incoming component signal in each incoming direction in which the reverberation component is suppressed to the statistic selection unit 123 when an operation mode is in a runtime mode (Run-time Mode). The runtime mode is an operation mode in which voice recognition processing is executed. The voice emphasis unit 113 outputs an incoming component signal in each incoming direction to the model generation unit 121 when the operation mode is a training mode (Training mode). The training mode is an operation mode in which a statistic configuring a voice recognition model or a statistic used in updating the voice recognition model is calculated without performing the voice recognition processing. Accordingly, in the runtime mode, the direct sound component of the incoming component is used for voice recognition as described below. On the other hand, in the training mode, both the direct sound component and the reflected sound component are used for calculation of statistics. A specific example of the suppression of a reverberation component using the Wiener filtering method will be described below. The voice emphasis unit 113 may also output the incoming direction signal input from the sound source separation unit 112 to the direct sound determination unit 114.

The direct sound determination unit 114 determines whether the incoming component signal input from the voice emphasis unit 113 is an incoming component signal in which an incoming component indicates a direct sound component or an incoming component signal in which an incoming component indicates a reflected sound component in each incoming direction. The direct sound determination unit 114 outputs the incoming component signal indicating a direct sound component to the statistic selection unit 123. The direct sound determination unit 114 may also output the incoming direction signal input from the voice emphasis unit 113 to the statistic selection unit 123. A specific example of determination of a direct sound component will be described below.

The model generation unit 121 calculates a statistic for updating an acoustic model for each incoming component.

The acoustic model is a statistical model which represents a relationship between an acoustic feature amount obtained from a voice signal to be processed and a recognized phoneme in a voice recognition model used for voice recognition. The acoustic model is a hidden Markov model (HMM) based on a Gaussian mixture model (GMM). GMM is a statistical model which represents an output probability in a certain utterance state for an acoustic feature amount calculated from the voice signal to be processed with a value obtained by a linear combination based on a plurality of (for example, 128 to 512) multi-dimensional Gaussian functions. The number of dimensions in the Gaussian function corresponds to the number of dimensions of the acoustic feature amount which is a vector quantity. Model parameters of GMM include a mixture weight (mixture weight) which represents the contribution of each Gaussian function when calculating the output probability, and a mean (mean) and a covariance matrix which represent the features of each Gaussian function. In the following description, the covariance matrix may be simply referred to as variance. In contrast, the mixture weight and the mean are a scalar quantity and a vector quantity, respectively. GMM may be used to determine a type of a sound source on the basis of a time series of acoustic feature amounts. Model parameters of HMM further include the same type of model parameters as the model parameters of GMM and a transition probability (transition probability) which indicates a transition probability between utterance states. The model generation unit 121 calculates a mixture weight, a mean, and variance of each base in each incoming component as examples of statistics. A model parameter in each incoming component is derived based on an accumulation mixed element occupancy, a mean, and variance of each base in each utterance state. More specifically, an updating amount of a mixture weight of each incoming component corresponds to an accumulation mixed element occupancy of a base of a calculation target, which is normalized by a sum of accumulation mixed element occupancy between bases related to the incoming component. A mean of each incoming component corresponds to a mean of the base which is normalized by the accumulation mixed element occupancy of the base of a calculation target in the incoming component. Variance of each incoming component is a matrix obtained by subtracting a product (matrix) of a mean of a base and a transpose vector of the mean from variance (matrix) of the base normalized by an accumulation mixed element occupancy of the base of a calculation target. The model generation unit 121 may also calculate a transition probability of each base as a statistic. The transition probability of each base for each incoming component is a state transition occupancy from a transition source state to a transition destination state of a calculation target, which is normalized by a sum of transition destination states of the state transition occupancy from a transition source state of a calculation target to a transition destination state. As a predetermined base in the calculation of a statistic, for example, a base which configures HMM trained using a clean voice can be used. The accumulation mixed element occupancy is given as an appearance frequency for each set of a state and a base. The state transition occupancy is given as an appearance frequency for each set of a group of transitions from a source state to a destination state and a base.

Processing to derive mixture weights, means, and variances is described, for example, in a following document.

Gomez R., Nakamura K., Mizumoto T. and Nakadai K., "Compensating changes in speaker position for improved voice-based human-robot communication", Proceedings of IEEE/RAS Humanoids, 2015.

In the training mode, sounds uttered from a plurality of sound source positions in a room in which the voice processing device 10 is installed are prepared in advance as a training data set. The total number Q of incoming components is sufficiently greater than the number M of reflected sound components detected at one time. The model generation unit 121 calculates a statistic which gives an acoustic model with higher likelihood on the basis of an incoming component signal for each incoming component q based on a sound from each sound source position. The model generation unit 121 calculates, for example, a statistic which gives an acoustic model $\lambda_c'$ in which an expectation value L of likelihood calculated using an acoustic model $\lambda_c$ for each incoming component q is maximized as shown in Equation (1). In the following description, the expectation value L of likelihood may be simply referred to as a likelihood L for an acoustic model or a statistic of the acoustic model.

$$\lambda_c' = \underset{\lambda_c}{\mathrm{argmax}} \sum_r L(o_q^r | \lambda_c) \qquad (1)$$

In Equation (1), $o_q^r$ indicates an acoustic feature amount in the $r^{th}$ utterance calculated from an incoming component signal of an incoming component q. That is, a statistic is calculated so that a total or a mean of likelihoods calculated using an acoustic model $\lambda_c$ for each utterance of the incoming component q is maximized. In calculation of a statistic, a direct sound component and a reflected sound component in each incoming direction are used. The model generation unit 121 stores a set of an accumulation mixed element occupancy $\gamma_{ib}^{(q)}$, a mean $m_{ib}^{(q)}$ (vector), and variance $v_{ib}^{(q)}$ (matrix) in the model storage unit 122 as a statistic $\Phi(\alpha_q)$ calculated for each incoming component q. Here, i and b indicate an $i^{th}$ utterance state and a $b^{th}$ base, respectively. The model generation unit 121 may store the statistic $\Phi(\alpha_q)$ in the model storage unit 122 further in correlation with an incoming direction $\alpha_q$ of the incoming component q.

The statistic $\Phi(\alpha_q)$ for each incoming component q is stored in the model storage unit 122. In addition, an acoustic model and a language model which are generated to maximize likelihood on the basis of a clean voice are stored in the model storage unit 122 in advance. The language model is a statistical model which represents a constraint of a phoneme column and an output probability for each phoneme column among voice recognition models. The language model is, for example, N-gram.

The statistic selection unit 123 selects statistics $\Phi(\alpha_q)$ for $Q^{opt}$ incoming directions $\alpha_q$ from an incoming direction the closest to an incoming direction of an incoming component signal input from the direct sound determination unit 114 among the statistics stored in the model storage unit 122. $Q^{opt}$ is a predetermined positive integer sufficiently smaller than Q. $Q^{opt}$ is equal to or less than K, for example, 1 to 3. When $Q^{opt}$ is one, a statistic of an incoming component determined as a direct sound component is selected and a statistic of an incoming component determined as a reflected sound component is not selected. The statistic selection unit 123 uses a method based on, for example, a likelihood when selecting the statistic $\Phi(\alpha_q)$. More specifically, the statistic selection unit 123 derives HMM$\lambda_q$ (to be described below) which is a type of an acoustic model from each of the statistics $\Phi(\alpha_q)$, and calculates likelihood $L(o|\lambda_q)$ for an acoustic feature amount o calculated from an incoming component signal on the basis of the derived HMM$\lambda_q$. The statistic selection unit 123 specifies $Q^{opt}$ HMM$\lambda_q$ giving a $Q^{opt-th}$ highest likelihood from a maximum likelihood among Q likelihoods $L(o|\lambda_q)$ which have been calculated, and selects $Q^{opt}$ statistics $\Phi(\alpha_q)$ based on each of the specified HMM$\lambda_q$.

The method of selecting statistics described above is described, for example, in a following document.

Gomez, R., Kawahara, T. and Nakadai, K., "Optimized wavelet-domain filtering under noisy and reverberant condition", Proceedings on Transactions on Signal and Processing, 2015.

The statistic selection unit 123 may specify an incoming direction of an incoming component signal with reference to the incoming direction signal input from the direct sound determination unit 114 when selecting a statistic $\Phi(\alpha_q)$, and may select the statistics $\Phi(\alpha_q)$ stored in correlation with each of the $Q^{opt}$ incoming directions $\alpha_q$ from an incoming direction which is the closest to the specified incoming direction. A section in which the statistic selection unit 123 selects a statistic $\Phi(\alpha_q)$ may be limited to a section determined to be voiced by performing voice activity detection (to be described below) on the incoming component signal. In addition, a frequency at which the statistic selection n unit 123 selects a statistic $\Phi(\alpha_q)$ may be lower than a frequency (for example, every 10 to 50 ms) for sound source localization, sound source separation and voice emphasis. The frequency may be, for example, 100 ms to 1 s, and may be once each utterance or the like.

The statistic selection unit 123 outputs the selected $Q^{opt}$ statistics $\Phi(\alpha_q)$ to the model updating unit 124, and outputs the input incoming direction signal to the voice recognition unit 130.

The model updating unit 124 updates an acoustic model which is generated on the basis of a clean voice and stored in the model storage unit 122 using the statistic $\Phi(\alpha_q)$ selected by the statistic selection unit 123. The model updating unit 124 updates the acoustic model to increase an expectation value of a likelihood L calculated for an incoming direction signal used for selection of the statistic $\Phi(\alpha_q)$. The model updating unit 124 can use, for example, maximum likelihood linear regression (MLLR) when updating an acoustic model. The model updating unit 124 outputs an updated acoustic model to the voice recognition unit 130. A specific example of updating an acoustic model will be described below.

The voice recognition unit 130 performs voice recognition processing on the incoming component signal input from the statistic selection unit 123 using an acoustic model input from the model updating unit 124 and a language model read from the model storage unit 122. For an incoming component signal used for a selection of a statistic, a phoneme column which indicates utterance content is estimated using an acoustic model updated using the statistic. Here, the voice recognition unit 130 calculates an acoustic feature amount for each predetermined time (for example, 10 ms), calculates a first likelihood for each possible phoneme column using the acoustic model input from the model updating unit 124 for the calculated acoustic feature amount, and determines the predetermined number of phoneme column candidates in descending order of the first likelihood. Then, the voice recognition unit 130 calculates a second likelihood for each candidate for a sentence represented by a phoneme column using a language model for each candidate for the phoneme column. The voice recognition unit 130 determines a sentence with a highest total likelihood which is obtained by synthesizing the first likelihood and the second likelihood as a recognition result.

(Estimation of an Incoming Direction)

Next, the MUSIC method which is a method of estimating an incoming direction will be described.

The sound source localization unit 111 includes a storage unit in which transfer functions for each sound source direction distributed at predetermined direction intervals (for example, 1 to 5°) are stored in advance. The sound source localization unit 111 generates a transfer function vector $A(\omega,\alpha)$ which sets a transfer function from a sound source installed in a direction $\alpha$ having a position of the sound receiving unit 15 as a reference to a sound receiving element of each channel $\phi$ ($\phi$ is an integer from 1 to $\Phi$) as an element. $\omega$ indicates a frequency.

On the other hand, the sound source localization unit 111 calculates a transformation coefficient of a frequency region by performing a short-time Fourier transform (STFT) for each sub-frame (for example, 10 to 20 ms) made from the predetermined number of samples on a voice signal of each channel $\phi$ ($\phi$ is an integer from 1 to $\Phi$). The sound source localization unit 111 calculates a time mean of correlation coefficients between channels of the calculated transformation coefficient within a predetermined frame period (for example, 50 to 100 ms), and generates an input correlation matrix $X(\omega, f)$ in which the calculated time mean is set as an element value. The input correlation matrix is a matrix of $\Phi$ rows and $\Phi$ columns, and a row and a column in which element values are disposed correspond to one channel and another channel, respectively. f is an index indicating a frame.

The sound source localization unit 111 performs an eigenvalue development on the generated input correlation matrix $X(\omega, f)$, and calculates $\Phi$ eigenvectors $e_1(\omega,f), \ldots,$ and $e_\Phi(\omega,f)$. Here, an order $1, \ldots,$ and $\Phi$ of the eigenvectors $e_1(\omega,f), \ldots,$ and $e_\Phi(\omega,f)$ is descending order of corresponding eigenvalues. The sound source localization unit 111 calculates a spatial spectrum $P(\omega,\alpha,f)$ on the basis of a transfer function vector $A(\omega,\alpha)$ and $K+1^{th}$ to $\Phi^{th}$ eigenvectors for each sound source direction, that is, each incoming direction $\alpha$. The spatial spectrum $P(\omega,\alpha,f)$ is represented by Equation (2).

$$P(\omega, \alpha, f) = \frac{|A^*(\omega, \alpha)A(\omega, \alpha)|}{\sum_{\phi=K+1}^{\Phi} |A^*(\omega, \alpha)e_\phi(\omega, f)|} \quad (2)$$

The sound source localization unit 111 calculates a sum of frequencies of the spatial spectrum $P(\omega,\alpha,f)$ in a frequency band in which power is greater than a predetermined threshold value as an extended spatial spectrum $P_{ext}(\omega,\alpha,f)$. The sound source localization unit 111 selects a maximum of K incoming directions $\alpha$ in which the calculated extended spatial spectrum $P_{ext}(\omega,\alpha,f)$ exceeds a predetermined threshold value and gives a maximum value in descending order of the maximum value. Since the maximum value of the extended spatial spectrum $P_{ext}(\omega,\alpha,f)$ does not exceed the threshold value in some cases, the number of selected incoming directions may be K−1 or there may also be an incoming direction which is not specified.

The sound source localization unit 111 may also calculate a sound source direction using methods other than the MUSIC method. The sound source localization unit 111 may also use, for example, a generalized eigenvalue decomposition (GEVD)-MUSIC method, a generalized singular value decomposition (GSVD)-MUSIC method, a weighted delay and sum beam forming (WDS-BF) method, and the like.

(Sound Source Separation)

Next, a GHDSS method which is one of methods for sound source separation will be described.

The GHDSS method is a method of adaptively calculating a separation matrix $\Omega(\omega,f)$ to reduce a separation sharpness $J_{SS}(\Omega(\omega,f))$ and a geometric constraint $J_{GC}(\Omega(\omega,f))$ as two cost functions. The separation matrix $\Omega(\omega)$ is a matrix used to calculate an estimated value vector which is a transformation coefficient vector $u(\omega)$ for each incoming component of L channels by multiplying a transformation coefficient vector $x(\omega,f)$ of a voice signal of $\Phi$ channels input from the sound source localization unit 111 by the separation matrix $\Omega(\omega,f)$.

The separation sharpness $J_{SS}(\Omega(\omega,f))$ and the geometric constraint $J_{GC}(\Omega(\omega,f))$ are represented by Equations (3) and (4), respectively.

$$J_{SS}(\Omega(\omega,f)) = \|\phi(u(\omega,f))[u'(\omega,f)]^H - \text{diag}[\phi(u'(\omega,f))u'(\omega,f)]\|^2 \quad (3)$$

$$J_{GC}(\Omega(\omega)) = \|\text{diag}[\Omega(\omega,f)(X(\omega,f)-I)]\|^2 \quad (4)$$

In Equations (3) and (4), $\|\ldots\|^2$ is the Frobenius norm of a matrix . . . . The Frobenius norm is the sum of squares (a scalar value) of each element value configuring a matrix. $\phi(u(\omega,f))$ is a non-linear function of an estimated value vector $u(\omega,f)$, for example, a hyperbolic tangent function. $[\ldots]^H$ indicates a conjugate transpose of a matrix or a vector. diag[ . . . ] indicates a sum of diagonal components of a matrix . . . . Accordingly, a separation sharpness $J_{SS}(\Omega(\omega))$ is an index value which indicates a magnitude of an inter-channel non-diagonal component of a spectrum of an incoming component (an estimated value), that is, an extent to which one incoming component is erroneously separated as another incoming component.

In Equation (4), I indicates a unit matrix. Accordingly, the geometric constraint $J_{GC}$ ($\Omega(\omega,f)$) is an index value which indicates a degree of error between the spectrum of an incoming component (an estimated value) and the spectrum of an incoming component (sound source).

Then, the sound source separation unit 112 calculates the estimated value vector $u(\omega)$ which has a transformation coefficient of each of the K incoming components as an element by multiplying the transformation coefficient vector $x(\omega,f)$ of a voice signal of $\Phi$ channels input from the sound source localization unit 111 by the separation matrix $\Omega(\omega,f)$ as shown in Equation (5).

$$u(\omega,f) = \Omega(\omega,f) x(\omega,f) \quad (5)$$

The sound source separation unit 112 may also acquire an incoming component signal for each incoming component using methods other than the GHDSS method. The sound source separation unit 112 may also use, for example, an independent component analysis (ICA) method, a decorrelation-based source separation method, and the like.

(Reverberation Suppression)

Next, a Wiener filtering method which is a method of reverberation suppression will be described.

The Wiener filtering method is processing for forming a linear filter which minimizes a mean square error between an incoming component signal where a filtered reverberation component is added (reverberation added signal) and a reverberation suppression signal by assuming that the reverberation component is not correlated with the incoming component signal in which the reverberation component is suppressed (hereinafter, the reverberation suppression signal). This linear filter is also called a Wiener gain. The calculated Wiener gain is used to generate a reverberation removal signal by filtering the reverberation added signal.

Here, the voice processing device 10 includes a voice activity detector (not shown) which performs voice activity detection (VAD) on an incoming component signal in each incoming direction. The voice activity detection is processing of determining whether the incoming component signals include a voice.

For example, the voice activity detection is processing of determining the incoming component signal to be voiced when power of the incoming component signal is higher than a preset threshold value and the number of zero crossings is in a predetermined range (for example, more than 100 to 200 times per second), and determines the incoming component signal to be voiceless in the other cases. The number of zero crossings is the number of times a signal value in a time region crosses zero per unit time, that is, the number of times the signal value changes from a negative value to a positive value or from a positive value to a negative value.

The voice emphasis unit 113 calculates a wavelet coefficient $S_k'(v,\tau)$ by performing wavelet transform (wavelet transform) on a transformation coefficient $s_k(\omega,f)$ in each incoming direction. k indicates an individual incoming component. v indicates a scaling parameter (scaling parameter). The scaling parameter is a coefficient indicating a feature of a base used for the wavelet transform. $\tau$ indicates a shift parameter (shift parameter). The shift parameter is a coefficient which indicates a shift (shift) amount of a base used for calculations in the wavelet transform. Then, the voice emphasis unit 113, as shown in Equation (6), calculates a ratio of a squared value of the wavelet coefficient $S_k'(v,\tau)$ of an incoming component signal to a sum of squares of the wavelet coefficient $S_k'(v,\tau)$ of an incoming component signal and a wavelet coefficient $R(v,\tau)$ of a reverberation component as a Wiener gain $\kappa$. Here, a wavelet coefficient of an incoming component signal determined to be voiced is used as the wavelet coefficient $S_k'(v,\tau)$ of an incoming component signal, and a wavelet coefficient of an incoming component signal determined to be voiceless is used as the wavelet coefficient $R(v,\tau)$ of a reverberation component.

$$\kappa = \frac{S_k'(v,\tau)^2}{S_k'(v,\tau)^2 + R(v,\tau)^2} \quad (6)$$

Then, the voice emphasis unit 113 calculates a wavelet coefficient $E(v,\tau)$ of an estimated value of a reverberation suppression signal by multiplying the wavelet coefficient $S_k'(v,\tau)$ by the Wiener gain $\kappa$. The voice emphasis unit 113 performs an inverse wavelet transform on the calculated wavelet coefficient $E(v,\tau)$, and calculates the transformation coefficient $E(v,\tau)$ of a reverberation suppression signal as a transformation coefficient of a reverberation suppression signal in which a reverberation component is suppressed. Furthermore, the voice emphasis unit 113 generates a reverberation suppression signal, that is, an incoming component signal in which a reverberation component is suppressed, by performing a short-time inverse Fourier transform on the transformation coefficient of a reverberation suppression signal.

The voice emphasis unit 113 may suppress the reverberation component using methods other than the Wiener filtering method. The voice emphasis unit 113 may also use, for example, a spectral subtraction method and the like.

(Determination of Direct Sound Component)

Figure 2:
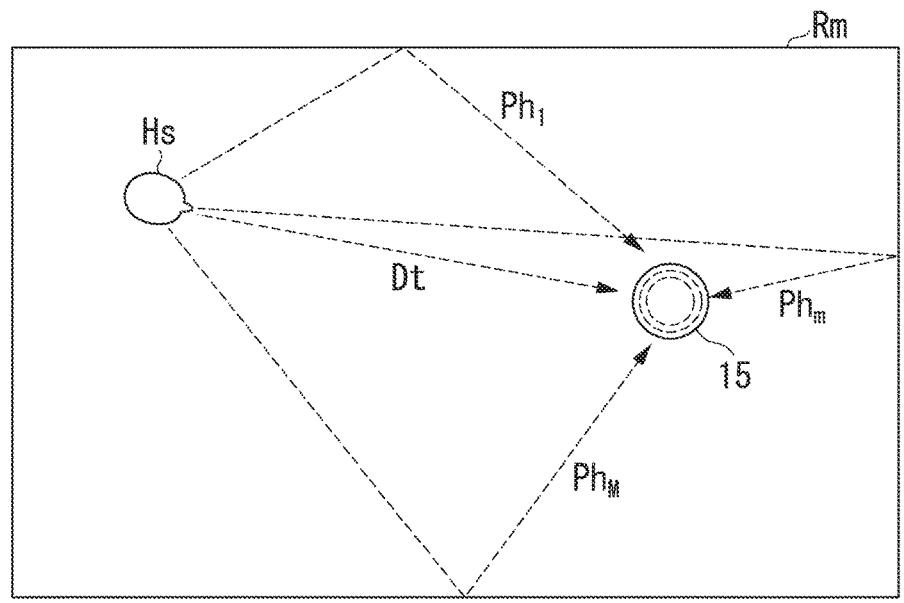
FIG. 2 is a schematic diagram which shows examples of a direct sound and a reflected sound.

Next, a method in which the direct sound determination unit 114 determines an incoming component signal which indicates a direct sound component will be described. The direct sound determination unit 114 estimates a direction of a speaker that is a sound source on the basis of a position of a mouth of the speaker represented by an image represented by image data acquired from an imaging unit (not shown). The direct sound determination unit 114 specifies the image of the mouth of the speaker using a known image recognition technology when the position of the mouth of the speaker is determined. The imaging unit is, for example, installed on a head portion of a robot near the sound receiving unit 15, and photographing parameters of the imaging unit such as an optical axis direction, a viewing angle, and resolution are set in the direct sound determination unit 114 in advance. The image data is three-dimensional data made from a pixel value and a depth value for each pixel arranged in a two-dimensional plane orthogonal to the optical axis of the imaging unit. The depth value is a coordinate value in a direction parallel to an optical axis direction of a position of a subject represented by a pixel. As the image recognition technology, for example, AdaBoost using a haar-like feature amount of an image can be used. AdaBoost is a method of pattern recognition. The direct sound determination unit 114 specifies a position of a center of gravity point in the image of the mouth of the speaker, and calculates a direction of the speaker with the position of the sound receiving unit 15 set as a reference on the basis of the optical axis direction, the viewing angle, and the resolution of the imaging unit for the specified position. The direct sound determination unit 114 determines an incoming component signal related to an incoming direction which has the smallest difference between incoming directions from the calculated direction of the speaker among incoming directions indicated by the incoming direction signal input from the sound source localization unit 111 as an incoming component signal indicating a direct sound component. The direct sound determination unit 114 determines the other incoming component signals as incoming component signals indicating reflected sound components. This determination is based on that fact that an incoming direction $\phi_k$ of the direct sound Dt is correlated with a real sound source direction, and an incoming direction $\phi_k$ of a reflected sound $P_m$ is not correlated with a sound source direction as shown in FIG. 2.

The direct sound determination unit 114 may determine an incoming component signal which indicates a direct sound component on the basis of a cross-correlation coefficient between a plurality of incoming component signals. The direct sound determination unit 114, for example, shifts a sample of one signal in signal pairs respectively made from two incoming component signals, and calculates a correlation coefficient between the shifted one signal and the other signal for each shift amount. The direct sound determination unit 114 specifies each group of incoming component signals configuring a signal pair in which a maximum value of the correlation coefficient between shift amounts is equal to or greater than a predetermined threshold value (for example, 0.5 to 0.7) as incoming component signals with a common sound source. The direct sound determination unit 114 determines the most preceding incoming component signal as an incoming component signal which indicates a direct sound component and determines the other incoming component signals as incoming component signals which indicate reflected sound components on the basis of the shift amount having a maximum value among each group of incoming component signals. When only one incoming component signal is included in a group of incoming component signals, the incoming component signal is determined as an incoming component signal indicating a direct sound component. This determination is based on a fact that a transmission path of a direct sound component from the sound source to the sound receiving unit 15 is shorter than a transmission path of a reflected sound component.

(Updating of an Acoustic Model)

Next, as a specific example of an updating method of an acoustic model, an updating method based on a mean of a Gaussian function used as a base function of HMM and MLLR of variance will be described. The model updating unit 124 calculates updating parameters $K^{(p)}$ and $G^{(p)-1}$ shown in Equation (7) and Equation (8), respectively, using the selected statistic $\Phi(\alpha_q)$.

$$k^{(p)} = \sum_{b=1}^{B} \frac{1}{\sigma_{bp}} \varepsilon_c \sum_{q=1}^{Q^{opt}} m_{ib}^{(q)} \quad (7)$$

$$G^{(p)-1} = \sum_{b=1}^{B} \frac{1}{\sigma_{bp}} \varepsilon_c \varepsilon_c^T \sum_{q=1}^{Q^{opt}} \gamma_{ib}^{(q)} \quad (8)$$

In Equation (7) and Equation (8), $k^{(p)}$ indicates a row vector at a $p^{th}$ row which is a configuration element of a matrix K (to be described below). b indicates an index of a Gaussian function used as a base of an acoustic model. B indicates the total number of bases. $1/\sigma_{bp}$ indicates an element value of row p and column p of an inverse matrix for variance of a $b^{th}$ base. $\varepsilon_c$ indicates an extended mean vector. T indicates a transpose of a vector or a matrix. $\gamma_{ib}^q$ indicates the variance (matrix) of a $b^{th}$ base in a $i^{th}$ state according to a $q^{th}$ incoming component.

The model updating unit 124 assigns 1 a first element value and first to $n^{th}$ element values of a mean $\mu_b$ (n dimensional vector) of the base b before updating as second to n+1$^{th}$ element values, and configures an extended mean vector $\varepsilon_c$ which is an n+1 dimensional column vector. The model updating unit 124 calculates a vector value $G^{(p)-1}k^{(p)T}$ which is obtained by multiplying a column vector $k^{(p)T}$ obtained by transposing the row vector $k^{(p)}$ by a matrix $G^{(p)-1}$ as a column vector $w^{(p)T}$ at a $p^{th}$ column. The model updating unit 124 combines a row vector $w^{(p)}$ between rows obtained by transposing the calculated column vector $w^{(p)T}$ at a $p^{th}$ column and calculates a transform matrix W. Then, the model updating unit 124 calculates a vector $W\varepsilon_c$ obtained by multiplying an extended mean vector of the mean $\mu_b$ of the base b by the calculated transform matrix W as a mean $\mu_b^{adp}$ of the base b after the update.

Thereafter, the model updating unit 124 calculates an updating parameter H (matrix) shown in Equation (9) using the selected statistic $\Phi(\alpha_q)$ and the selected mean $\mu_b^{adp}$ of the base b after the update.

$$H = \frac{\sum_{b=1}^{B} C_b^T C_b}{\sum_{b=1}^{B} \sum_{q=1}^{Q^{opt}} \gamma_{ib}^{(q)}} \quad (9)$$

$$\left[ \sum_{q=1}^{Q^{opt}} \mu_{ib}^{(q)} \sum_{q=1}^{Q^{opt}} m_{ib}^{(q)} \mu_b^{adpT} - \sum_{q=1}^{Q^{opt}} m_{ib}^{(q)} \mu_b^{adp} + \sum_{q=1}^{Q^{opt}} \gamma_{ib}^{(q)} \mu_b^{adp} \mu_b^{adpT} \right]$$

In Equation (9), $C_b$ indicates a Choleski factor (Choleski factor) of the variance $\sigma_b$ (matrix) of the base b of HMM to be updated. Here, the model updating unit 124 performs Choleski decomposition on the variance $\sigma_b$ (matrix) before calculating an updating parameter H (matrix), and calculates the Cholesky factor $C_b$ and its inverse matrix $C_b^{-1}$ in advance.

The model updating unit 124 calculates a matrix $(C_b^{-1})^T H C_b^{-1}$ obtained by multiplying the calculated inverse matrix $C_b^{-1}$ and a transpose matrix $(C_b^{-1})^T$ of the inverse matrix $C_b^{-1}$ as the variance $\sigma_b$ of the base b after the update. The model updating unit 124 executes the calculation described above for each base b.

The updating method of an acoustic model described above is described, for example, in the following document.

Gales, M. and Woodland, P. C., "Mean and Variance Adaptation within the MLLR framework", Proceedings of the IEEE Computer Speech and Language, 1996.

By using an acoustic model updated using a statistic according to a direct sound component, decline of voice recognition rate for the incoming component signal indicating the direct sound component is prevented. In addition, by also using a statistic according to a reflected sound component having an incoming direction adjacent to that of the direct sound component as a statistic used for updating an acoustic model, changes in the feature of the updated acoustic model due to a time change in the selected statistic are mitigated.

Therefore, more stable voice recognition results will be obtained.

(Voice Processing)

Figure 3:
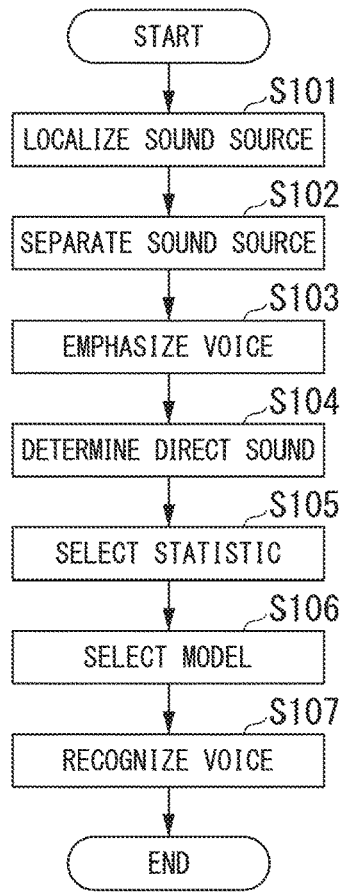
FIG. 3 is a flowchart which shows an example of voice processing according to the first embodiment.

Next, voice processing according to the present embodiment will be described. FIG. 3 is a flowchart which shows an example of the voice processing according to the present embodiment. The processing shown in FIG. 3 is executed when an operation mode is a runtime mode.

(Step S101) The sound source localization unit 111 performs sound source localization processing on the voice signals of Φ channels acquired by the sound receiving unit 15 for each predetermined period, and estimates K incoming directions. Thereafter, the procedure proceeds to processing of step S102.

(Step S102) The sound source separation unit 112 performs blind source separation processing on the voice signals of Φ channels and separates the voice signals into incoming component signals of each of the K incoming directions. Then, the procedure proceeds to processing of step S103.

(Step S103) The voice emphasis unit 113 relatively emphasizes a voice component by suppressing a reverberation component included in incoming component signals for each incoming direction. Then, the procedure proceeds to processing of step S104.

(Step S104) The direct sound determination unit 114 determines that an incoming component signal according to an incoming direction closest to a sound source direction among the incoming component signals in each incoming direction is an incoming component signal according to a direct sound component. Then, the procedure proceeds to processing of step S105.

(Step S105) The statistic selection unit 123 selects a statistic $\Phi(\alpha_q)$ for each of $Q^{opt}$ incoming directions $\alpha_q$ in ascending order of an angle formed with an incoming direction corresponding to the incoming component signal according to the direct sound component. Then, the procedure proceeds to processing of step S106.

(Step S106) The model updating unit 124 updates a model parameter configuring the acoustic model stored in the model storage unit 122 using the selected statistic $\Phi(\alpha_q)$ for each of $Q^{opt}$ incoming directions $\alpha_q$. Then, the procedure proceeds to processing of step S107.

(Step S107) The model updating unit 124 performs voice recognition processing on the incoming component signal according to the direct sound component using the updated acoustic model and a language model set in advance, and acquires recognition data indicating recognition text as a recognition result. Then, the processing shown in FIG. 3 ends.

Second Embodiment

Next, a second embodiment of the present invention will be described. Unless particularly noted, the same configurations as in the first embodiment will be given the same reference numerals and description thereof will be cited.

Figure 4:
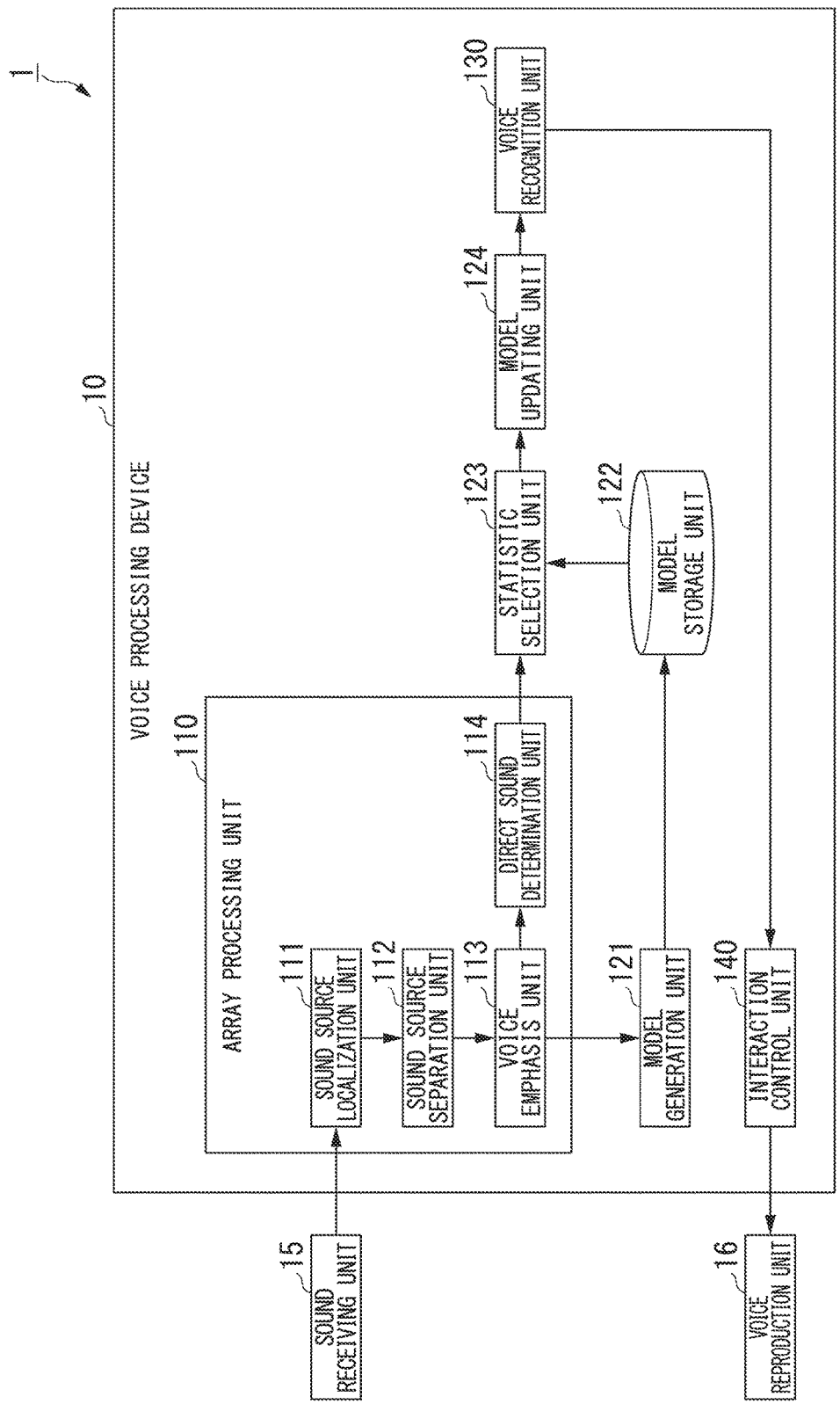
FIG. 4 is a block diagram which shows a configuration example of a voice processing system according to a second embodiment.

FIG. 4 is a block diagram which shows a configuration example of the voice processing system 1 according to the present embodiment.

The voice processing system 1 is configured to further include a voice reproduction unit 16 in addition to a voice processing device 10 and a sound receiving unit 15.

The voice reproduction unit 16 reproduces voices based on a voice signal input from the voice processing device 10. The voice reproduction unit 16 is, for example, a speaker.

The voice processing device 10 is configured to include an interaction control unit 140 in addition to an array processing unit 110, a model generation unit 121, a model storage unit 122, a statistic selection unit 123, a model updating unit 124, and a voice recognition unit 130.

The interaction control unit 140 acquires response data which corresponds to recognition data indicating recognition text which is a recognition result input from the voice recognition unit 130. The interaction control unit 140 performs known text speech synthesis processing on the response text indicated by the acquired response data, and generates a response voice signal which is a voice signal indicating utterance content represented by the response text. The interaction control unit 140 outputs the generated response voice signal to the voice reproduction unit 16.

The interaction control unit 140 includes a storage unit (not shown) configured to store conversation data in advance, and a voice synthesizing unit (not shown) configured to synthesize a voice signal in accordance with a response text shown by response data.

The conversation data is formed by correlating utterance data and response data set in advance. The interaction control unit 140 collates recognition data with the utterance data and selects utterance data which indicates text matching the recognition text indicated by the recognition data. Then, the interaction control unit 140 specifies utterance data corresponding to the selected response data. The utterance data and the response data may include a translation section and an answer section, respectively. The translation section is a section which includes phrases of a source language to be translated. The answer section is a section which includes translated phrases of a target language. When utterance data and response data include a translation section and an answer section, respectively, the interaction control unit 140 determines whether a recognition text indicated by the recognition data matches a portion of utterance text indicated by the utterance data, which excludes the translation section, at a time of collating the recognition data with the utterance data.

The interaction control unit 140, when it is determined that they match, refers to a translation dictionary data set in advance for recognition text in a section corresponding to the translation section among the recognition data and specifies response text corresponding to the recognition text. The translation dictionary data is formed by correlating recognition text indicated by the phrases of a source language to be translated with response text indicated by phrases of a target language. The interaction control unit 140 assigns the specified response text to an answer section of the response data corresponding to the utterance data determined to match, and performs text speech synthesis processing on response text of all sections of the response data.

Next, operations of conversation data and the interaction control unit 140 will be described. FIG. 5 is a diagram which shows an example of conversation data according to the present embodiment.

Sp1 and Sp2 indicate utterance data. Rb1 and Rb2 indicate response data corresponding to the utterance data Sp1 and Sp2, respectively. In addition, an underlined portion of a solid line and an underlined portion of a dashed line indicate a translation section and an answer section, respectively. The utterance data Sp1 is made from English text meaning "Hello, I went to a restaurant in Tokyo and they served me sake. Do you know what is it in English?" in Japanese. Among the data, a section of "sake" meaning "liquor" is a translation section from Japanese into English. Recognition data corresponding to this translation section may include other phrases such as the name of a fish. The interaction control unit 140 specifies response data Rb1 corresponding to the utterance data Sp1 when it is determined that the utterance data Sp1 matches a portion obtained by excluding a translation section among recognition data from the voice recognition unit 130. The response data Rb1 is made from English text meaning "They call it rice wine" in Japanese. Among the data, a section of "rice wine" is an answer section. The interaction control unit 140 specifies "sake" as a recognition text in the translation section among the recognition data. The interaction control unit 140 acquires response text of "rice wine" in the target language English, which corresponds to "sake" in the source language Japanese with reference to translation dictionary data related to translation from Japanese into English. Then, the interaction control unit 140 assigns the acquired "rice wine" to an answer section of the response data Rb1 and generates a response text of all sections of the response data Rb1, "They call it rice wine." The interaction control unit 140 performs text speech synthesis processing on the generated response text, and generates a voice signal of the text. The interaction control unit 140 outputs the generated voice signal to the voice reproduction unit 16. Accordingly, an English utterance with the content "They call it rice wine" is reproduced.

(Operation Verification)

Next, operation verification performed on the voice processing system 1 according to the present embodiment will be described.

In the operation verification, a humanoid robot Rt on which the voice processing system 1 is mounted was used. As shown in FIG. 6, on the head of the robot Rt, 16 electro-acoustic transform elements 151 are arranged in two concentric circles in the same plane which have different radii to form the sound receiving unit 15. Eight of the electro-acoustic transform elements 151 are arranged at 45° intervals on both concentric circles. The other eight electro-acoustic transform elements 151 are arranged in a direction in which an azimuth angle is shifted by 22.5° from the eight electro-acoustic transform elements 151 arranged on the corresponding concentric circle.

The operation verification is performed in each of four experiment rooms 1 to 4. Plane sizes of the experiment rooms 1 to 4 are all 4.8 m×5.5 m. Reverberation times (RT: reverberation time) of the experiment rooms 1, 2, 3, and 4 are 80 ms, 240 ms, 900 ms, and 940 ms, respectively. An air conditioner and an electronic computer are installed in each of the experiment rooms 1 to 4, and operation sounds of these are presented as noise. A signal to noise ratio is about 15 to 20 dB.

FIG. 7 is a plan view of an experiment room 4. As shown in FIG. 7, three speaker positions P1 to P3 were set to verify a voice recognition rate in each experiment room. However, a position of the robot Rt was fixed. Positional relationships between the voice processing system 1 configured as the robot Rt and the speaker positions P1 to P3 were the same in the experiment rooms 1 to 4. A distance to the robot Rt increased in an order of the speaker positions P1, P2, and P3. Among them, the distance from the speaker position P1 to the robot Rt was the shortest and the distance from the speaker position P3 to the robot Rt was the longest. Accordingly, uttered voice from the speaker position P1 was the easiest to recognize and a voice uttered in the speaker position P3 received the greatest influence of reverberation. The robot Rt was a humanoid biped robot with a degree of freedom of 20. In addition, furniture such as two tables Tb, a sofa Sf, a white board Wb, and a refrigerator Rg was installed in the experiment room 4 as shown in FIG. 7. Positions at which this furniture was disposed were positions at which they did not shield a voice transported between the speaker positions P1 to P3 and the robot Rt. The number of incoming directions Q related to acquisition of a statistic was set to be 25.

In the operation verification, voice corpora of reading newspaper articles in each of Japanese and English was used as a clean voice database to acquire each statistic. Specifically, the voice corpora were the Japanese Newspaper Article Sentences (JNAS) corpus and the Wall Street Journal corpus. When a statistic of each incoming component was acquired, a voice of these clean voice databases was repeatedly reproduced from speakers installed at all positions in the experiment room. Then, an incoming component signal in each incoming direction was acquired by operating the voice processing device 10 in a training mode.

In the operation verification, each of 20 utterances at each of the speaker positions P1 to P3 was collected for each of 10 speakers who spoke Japanese as their native language and 10 speakers who spoke English as their native language. As an interaction scenario between a speaker and a robot, a question and answer related to sushi and sashimi exemplified in FIG. 5 was used. In the question and answer, each native language was set as a source language for each speaker and a question regarding the name of a fish was uttered. At this time, as a response by the robot, a voice of the name in a target language corresponding to the name was reproduced. In the interaction scenario, it was less likely to depend on a language and utterance contents, and more likely to mainly depend on an utterance related to the name of the fish. As a verification result, a word recognition rate by utterance was collected for each speaker position.

In addition, processing methods (A) to (L) are compared with each other in voice recognition rate to examine effectiveness of the voice recognition rate according to the present embodiment.

The method (A) is a method of performing voice recognition processing on a reverberation suppression voice obtained by suppressing a reverberation component using a spectral subtraction method for an input voice signal. However, in the method (A), model updating is not performed in the voice recognition processing (Old Enhancement). The method (B) is a method of performing the voice recognition processing on a reverberation suppression voice obtained by suppressing a reverberation component using a Wiener filtering method by the voice emphasis unit 113. Even in the method (B) (New Enhancement). The method (C) is a method of performing the voice recognition processing on the reverberation suppression voice obtained by the spectral subtraction method, using an acoustic model updated using a Baum-Welch (BW) method online. However, in the method (C), updating of an acoustic model based on a statistic in accordance with the acoustic environment in a room is not performed (Old Enhancement+BW online). The method (D) is a method of performing the voice recognition processing on the reverberation suppression voice obtained by the Wiener filtering method, using the acoustic model updated using the BW method. In the method (D), the updating of an acoustic model based on the statistic in accordance with the acoustic environment in a room is not performed (New Enhancement+BW online). The method (E) is a method of performing the voice recognition processing on the reverberation suppression voice obtained by the Wiener filtering method, using the acoustic model updated using the BW method on the basis of the statistic in accordance with the acoustic environment in a room in advance (Env-adaptive Tr.+New Enhancement+BW online). The method (F) is a method of performing the voice recognition processing on the reverberation suppression voice obtained by the spectral subtraction method, using an acoustic model updated by an updating method based on MLLR using the statistic in accordance with the acoustic environment in a room in advance (Old Enhancement+MLLR online). The method (G) is a method of performing the voice recognition processing on the reverberation suppression voice obtained by the Wiener filtering method, using the acoustic model updated by an updating method based on MLLR using the statistic in accordance with the acoustic environment in a room in advance (New Enhancement+MLLR online).

The method (H) is a method performed by the voice processing device 10 described above. That is, the method (H) is a method having all of calculation of a statistic for each acquired component in the model generation unit 121, reverberation component suppression by the Wiener filtering method in the voice emphasis unit 113, and updating of an acoustic model based on MLLR in the model updating unit 124 (Env-adaptive Tr.+New Enhancement+MLLR online).

The method (I) is a method of performing the reverberation component suppression by the Wiener filtering method in the voice emphasis unit 113 and performing the voice recognition processing using an acoustic model updated in accordance with an incoming direction using a MLLR method offline. However, in the method (I), 15 utterances were used to update an acoustic model (New Enhancement+offline MLLR[15 adapt.utterances]). The method (J) is a method of performing the voice recognition processing using the updated acoustic model updated in accordance with an incoming direction using the MLLR method in advance in each experiment room offline while a statistic for each acquired component is calculated by the model generation unit 121 the same as the voice processing device 10 according to the present embodiment and reverberation component suppression by the Wiener filtering method is performed by the voice emphasis unit 113. In the method (J), 15 utterances are used to update an acoustic model (Env-adaptive Tr.+New Enhancement+offline MLLR[15 adapt.utterances]). The method (K) is similar to the method (I), but is different from the method (I) in that the number of utterances used in the updating of an acoustic model is 30 (New Enhancement+offline MLLR[30 adapt.utterances]). The method (L) is similar to the method (J), but is different from the method (J) in that the number of utterances used in the updating of an acoustic model is 30 (Env-adaptive Tr.+New Enhancement+offline MLLR[30 adapt.utterances]).

The BW method is a type of algorithm in which a model parameter of HMM is repeatedly calculated so that an expected value of likelihood for given utterance data increases. The BW method is a method of increasing likelihood by repeating following steps (1) to (4) until a change amount of likelihood converges on a predetermined amount of changes. (1) Processing of calculating a forward likelihood in chronological order and a backward likelihood in reverse order of the chronological order from input symbol sequences configuring utterance data on the basis of a state transition probability and a symbol output probability. (2) Processing of calculating a state transition probability of each time on the basis of the forward likelihood and the backward likelihood. (3) Processing of re-calculating the state transition probability from the state transition probability of each time to increase the likelihoods. (4) Processing of re-calculating the symbol output probability from the state transition probability of each time to increase the likelihoods. Accordingly, the BW method is different from the updating method based on the MLLR method in which a mean and variance for each base are updated in that the state transition probability for each base is updated. In order to update an acoustic model in accordance with the acoustic environment in a room, the state transition probability serving as a statistic for each incoming component, or an accumulation mixed element occupancy and a state transition occupancy for calculating the state transition probability may be acquired.

(Experimental Result)

Figure 8:
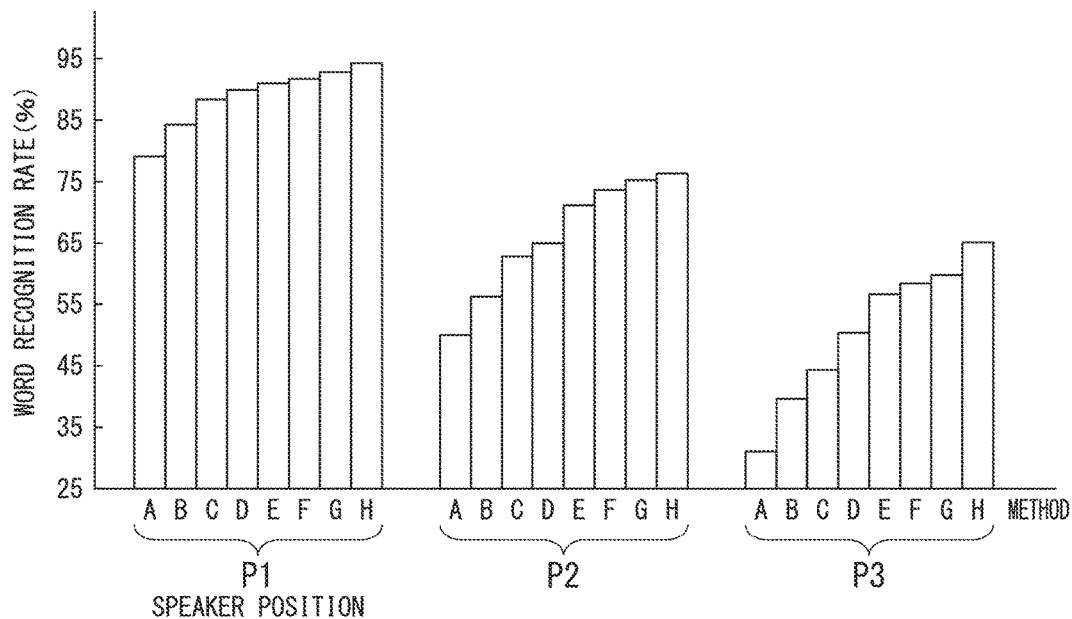
FIG. 8 is a diagram which shows an example of a word recognition rate for each processing method.

Next, an experiment result will be described. FIG. 8 is a diagram which shows an example of a word recognition rate for each processing method. A vertical axis represents a word recognition rate, and a horizontal axis represents a processing method for each speaker position. The word recognition rate is a mean between a speaker and the experiment rooms 1 to 4.

In the example shown in FIG. 8, word recognition rates are mainly compared between a reverberation suppression method and presence or absence of the updating of an acoustic model or an updating method. The word recognition rate decreases in order of the speaker positions P1, P2, and P3. That is, the word recognition rate decreases as the distance from the speaker position to the sound receiving unit 15 increases. In addition, among processing methods, the word recognition rate increases in order of the methods (A) to (H). For example, the word recognition rates at the speaker positions P1, P2, and P3 are 78%, 50%, and 31%, respectively in the method (A). The word recognition rates at the speaker positions P1, P2, and P3 are 94%, 76%, and 65%, respectively, in the method (H), that is, in the present embodiment. Accordingly, the word recognition rate in the method (H) according to the present embodiment is higher than in other methods. In addition, the fact that the word recognition rates in the methods (B), (D), and (G) are higher than in the methods (A), (C), and (F) indicates that reverberation suppression using the Wiener filtering method used in the present embodiment is more effective than using the spectral subtraction method. Moreover, the fact that the word recognition rates in the methods (E) and (H) are higher than in the methods (D) and (G) indicates that the voice recognition rate improves more when updating of an acoustic model in accordance with an acoustic environment is performed than when the updating is not performed. In particular, the fact that the word recognition rates in the methods (F) to (H) are higher than in the methods (C) to (E) indicates that the updating of an acoustic model based on the MLLR method exemplified in the present embodiment is more effective than based on the BW method.

Figure 9:
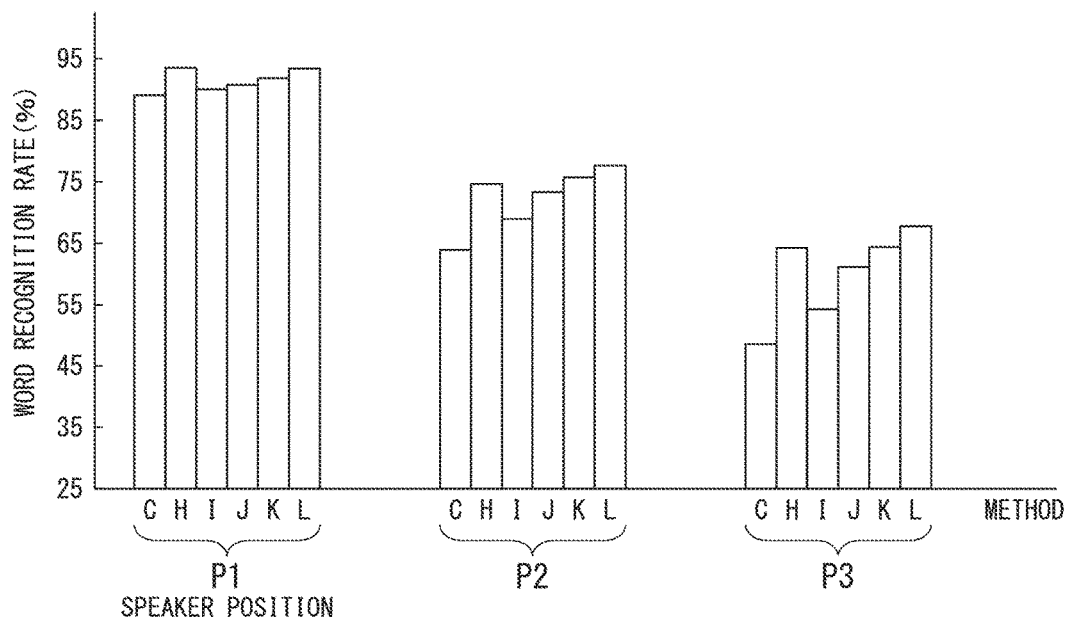
FIG. 9 is a diagram which shows another example of a word recognition rate for each processing method.

FIG. 9 is a diagram which shows an example of a word recognition rate for each processing method. In the example shown in FIG. 9, whether the updating of an acoustic model is online or offline and the word recognition rate by an utterance amount in offline updating are mainly compared.

Even in the example shown in FIG. 9, the word recognition rate decreases in order of the speaker positions P1, P2, and P3. Among the processing methods, the word recognition rate decreases in order of the methods (L), (K), (H), (J), (I), and (C). However, the word recognition rate in the method (H) is equivalent to the word recognition rate in the methods (L) and (K). For example, at the speaker position P1, the word recognition rates in the methods (H) and (L) are all 94%, and the word recognition rate in the method (K) is 93%. The word recognition rate in the method (H) is the highest among the word recognition rates in the methods (C) and (H) to (L). On the other hand, at the speaker position P3, the word recognition rates in the methods (H), (K), and (L) are 65%, 66%, and 68%, respectively, in which the word recognition rate in the method (H) is the third highest. The word recognition rates in the methods (I) and (J) which have smaller utterance amounts than the methods (K) and (L) are 57% and 63%, respectively, and both are lower than in the method (H). The updating of an acoustic model in the methods (C) and (H) is all performed online and time required for the updating is at most one second. On the other hand, the updating of an acoustic model in the methods (I), (J), (K), and (L) is all performed offline and required times are 10, 13, 16, and 18 seconds, respectively. Accordingly, it is possible to suppress the decline of voice recognition rate without requiring enough utterances for training an acoustic model by updating the acoustic model online in the method (H).

As described above, the voice processing device 10 includes the sound source separation unit 112 which separates voice signals of a plurality of channels into incoming components in each incoming direction. In addition, the voice processing device 10 includes a model storage unit 122 which stores statistics and a voice recognition model in each incoming direction, and a statistic selection unit 123 which selects a statistic corresponding to an incoming direction of an incoming component separated by the sound source separation unit 112 from the model storage unit 122. In addition, the voice processing device 10 includes a model updating unit 124 which updates a voice recognition model on the basis of a statistic selected by the statistic selection unit 123 and a voice recognition unit which recognizes a voice of an incoming component using an updated voice recognition model.

With such a configuration, utterance content of the voice of an incoming component is recognized using a voice recognition model updated on the basis of a statistic corresponding to an incoming direction of the incoming component. For this reason, the decline of voice recognition accuracy due to a change in the acoustic environment caused by a positional relationship between the sound source and the sound receiving unit 15 is suppressed.

Moreover, the statistic described above is the same type of parameter as a parameter of at least one portion of the voice recognition model. The voice processing device 10 includes a model generation unit 121 which stores a statistic calculated to increase likelihood for the separated incoming component in the model storage unit 122.

With such a configuration, parameters which increase likelihoods for different incoming components depending on an acoustic environment in which the sound source and the sound receiving unit 15 are installed are acquired as a statistic, and are stored in the model storage unit 122 in correlation with incoming directions of the incoming components. For this reason, the decline of voice recognition accuracy is suppressed, and at the same time, a calculation amount and processing time are reduced as compared to updating all parameters of a voice recognition model in parallel with voice recognition.

In addition, the voice recognition model described above is a model which represents an output probability of an acoustic feature amount as a linear combination of a plurality of Gaussian functions, and the statistic described above is a mixture weight, a mean, and variance of each of the Gaussian functions. Moreover, the model updating unit 124 updates the mean and the variation of Gaussian functions of the voice recognition model to increase the likelihood for the separated incoming component.

With such a configuration, the mean and the variance of Gaussian functions are updated as parameters which can effectively describe a variation in output probability in accordance with an acoustic feature amount by an incoming component. For this reason, the decline of voice recognition accuracy is suppressed, and at the same time, an amount of calculation and a processing time in updating the voice recognition model are reduced.

Moreover, in the voice processing device 10, the sound source separation unit 112 separates a direct sound component from a sound source from a reflected sound component as an incoming component, and the voice recognition unit 130 recognizes a voice of the separated direct sound component.

With such a configuration, a voice of a direct sound component directly arriving from the sound source among various incoming components is recognized. A reflected sound component which causes the decline of voice recognition accuracy is excluded from a recognition target, and thus the decline of voice recognition accuracy is suppressed.

In addition, the voice processing device 10 includes the voice emphasis unit 113 as a dereverberation unit which generates a dereverberation component using a predetermined filter coefficient from the incoming component separated by the sound source separation unit 112 and calculates a filter coefficient thereof to decrease a difference between a power of the generated dereverberation component and a power of a dereverberation component estimated on the basis of an incoming component in a voiced section and an incoming component in a voiceless section.

With such a configuration, an incoming component in a voiceless section is regarded as a reverberation component, and a filter coefficient is calculated so that a dereverberation component generated using a filter coefficient from the incoming component approximates a dereverberation component obtained by removing the reverberation component from an incoming component in a voiced section. For this reason, a voice component is obtained as the reverberation component generated using the filter coefficient calculated for the incoming component and a voice of the obtained voice component is recognized. Since a voice obtained by removing the reverberation component which causes the decline of voice recognition accuracy is gradually recognized, the decline of voice recognition accuracy is suppressed.

In the embodiments described above, the voice processing device 10 and one or both of the sound receiving unit 15 and the voice reproduction unit 16 are separate bodies; however, the invention is not limited thereto. One or both of the sound receiving unit 15 and the voice reproduction unit 16 may also be integrated with the voice processing device 10.

In addition, in the voice processing system 1, the voice reproduction unit 16 may be omitted, and the interaction control unit 140 may output voice signals to other devices, for example, terminal devices such as a multifunctional mobile phone (including a so-called smart phone) and a tablet terminal device, and cause a voice to be reproduced by a reproduction unit included in these devices.

In addition, the voice processing system 1 does not need to be integrated with a robot, and may be configured to be integrated with other moving bodies, for example, a drone. Such moving bodies may be unmanned or manned. Moreover, the voice processing system 1 may be realized as an independent device. Such a device may also be realized as the terminal device such as a multifunctional mobile phone.

A portion of the voice processing device 10 in the embodiments described above and a modified example, for example, all or a portion of the array processing unit 110, the model generation unit 121, the model storage unit 122, the statistic selection unit 123, the model updating unit 124, the voice recognition unit 130, and the interaction control unit 140, may be realized by a computer. In this case, a program for realizing this control function is recorded on a computer-readable recording medium, and the program recorded on this recording medium may be realized by being read into a computer system and executed. "Computer system" referred to herein is a computer system embedded in the voice processing device 10 and includes hardware such as an OS and peripheral devices. In addition, "computer-readable recording medium" refers to portable medium devices such as a flexible disk, a magneto-optical disc, a ROM, and a CD-ROM, and a storage device such as a hard disk embedded in a computer system. Furthermore, "computer-readable recording medium" may also include a device which dynamically holds a program for a short period of time like a communication line in the case of transmitting a program through a network such as the Internet or a communication line such as a telephone line, and a device which holds a program for a certain period of time like a volatile memory in a computer system which serves as a server or a client in this case. In addition, the program may be a program for realizing some of the functions described above, and may also be a program capable of realizing the functions described above in a combination with a program which has been recorded in a computer system.

In addition, a portion or all of the voice processing device 10 in the embodiment described above and a modified example may be realized as an integrated circuit such as Large Scale Integration (LSI) and the like. Each functional block of the voice processing device 10 may be individually performed as a processor, and some or all of the functional blocks may be integrated and processed. Moreover, a method of forming an integrated circuit is not limited to the LSI and may be realized by a dedicated circuit or a general-purpose processor. Furthermore, if a technology for forming an integrated circuit which replaces the LSI emerges as semiconductor technology advances, an integrated circuit based on the technology may also be used.

One embodiment of the present invention has been described above in detail with reference to drawings, but the specific configuration is not limited thereto and various design changes and the like can be made within a scope not departing from the gist of the invention.

What is claimed is:

1. A voice processing device comprising:
a separation unit, implemented via a processor, configured to separate voice signals of a plurality of channels into an incoming component in each incoming direction;
a storage device configured to store a predetermined statistic and a voice recognition model for each incoming direction;
a dereverberation unit, implemented via the processor, configured to generate a dereverberation component where a reverberation component is suppressed based on Wiener Filtering from the incoming component separated by the separation unit;
a selection unit, implemented via the processor, configured to select a statistic corresponding to an incoming direction of the dereverberation component generated by the dereverberation unit;
an updating unit, implemented via the processor, configured to update the voice recognition model on the basis of the statistic selected by the selection unit; and
a voice recognition unit, implemented via the processor, configured to recognize a voice of the incoming component using the updated voice recognition model,
wherein the dereverberation unit is configured to:
calculate a ratio of a squared value of a wavelet coefficient of the incoming component in a voiced section to a sum of the squared value of the wavelet coefficient of the incoming component in the voiced section and a squared value of a wavelet coefficient of the incoming component in a voiceless section, as a Wiener gain;
estimate the dereverberation component on the basis of a wavelet coefficient obtained by multiplying the wavelet coefficient of the incoming component in the voiced section by the Wiener gain; and
calculate the Wiener gain to reduce a difference between power of the estimated dereverberation component and power of the incoming component obtained by removing the incoming component in the voiceless section from the incoming component in the voiced section.

2. The voice processing device according to claim 1, wherein the statistic is the same type of parameter as at least some parameters of the voice recognition model, and the voice processing device further comprises a generation unit, implemented via the processor, configured to store in the storage device a statistic calculated so that likelihood for the incoming component increases.

3. The voice processing device according to claim 2, wherein the voice recognition model is a model which represents an output probability of an acoustic feature amount as a linear combination of a plurality of Gaussian functions, the statistic is a mixture weight, a mean, and variance of a Gaussian function, and the updating unit updates a mean and variance of a Gaussian function of the voice recognition model to increase likelihood for the incoming component.

4. The voice processing device according to claim 1, wherein the separation unit separates a direct sound component from a sound source from a reflected sound component as the incoming component, and the voice recognition unit recognizes a voice of the direct sound component.

5. A voice processing method in a voice processing device comprising:
a separation process, implemented via a processor, of separating voice signals of a plurality of channels into an incoming component in each incoming direction;
a dereverberation process, implemented via the processor, of generating a dereverberation component where a reverberation component is suppressed based on Wiener Filtering from the incoming component separated by the separation process;
a selection process, implemented via the processor, of selecting a statistic corresponding to an incoming direction of the dereverberation component generated by the dereverberation process;
a storage process, implemented via a storage device, of storing a predetermined statistic and a voice recognition model for each incoming direction;
an updating process, implemented via the processor, of updating the voice recognition model on the basis of the statistic selected in the selection process; and
a voice recognition process, implemented via the processor, of recognizing a voice of the incoming component using the updated voice recognition model,
wherein the dereverberation process includes:
calculating a ratio of a squared value of a wavelet coefficient of the incoming component in a voiced section to a sum of the squared value of the wavelet coefficient of the incoming component in the voiced section and, a squared value of a wavelet coefficient of the incoming component in a voiceless section, as a Wiener gain;

estimating the dereverberation component on the basis of a wavelet coefficient obtained by multiplying the wavelet coefficient of the incoming component in the voiced section by the Wiener gain; and calculating the Wiener gain to reduce a difference between the power of the estimated dereverberation component and power of the incoming component obtained by removing the incoming component in the voiceless section from the incoming component in the voiced section.

6. A non-transitory computer-readable storage medium storing a voice processing program which causes a computer to execute a process, the process comprising:

a separation process of separating voice signals of a plurality of channels into an incoming component in each incoming direction;

a dereverberation process of generating a dereverberation component where a reverberation component is suppressed based on Wiener Filtering from the incoming component separated by the separation unit;

a selection process of selecting a statistic corresponding to an incoming direction of the dereverberation component generated by the dereverberation unit;

a storage process of storing a predetermined statistic and a voice recognition model for each incoming direction;

an updating process of updating the voice recognition model on the basis of the statistic selected in the selection process; and a voice recognition process of recognizing a voice of the incoming component using the updated voice recognition model, wherein the dereverberation process includes:

calculating a ratio of a squared value of a wavelet coefficient of the incoming component in a voiced section to a sum of the squared value of the wavelet coefficient of the incoming component in the voiced section and a squared value of a wavelet coefficient of the incoming component in a voiceless section, as a Wiener gain;

estimating the dereverberation component on the basis of a wavelet coefficient obtained by multiplying the wavelet coefficient of the incoming component in the voiced section by the Wiener gain; and calculating the Wiener gain to reduce a difference between power of the estimated dereverberation component and power of the incoming component obtained by removing the incoming component in the voiceless section from the incoming component in the voiced section.

\* \* \* \* \*